United States Patent
Park et al.

[11] Patent Number: 6,011,496
[45] Date of Patent: Jan. 4, 2000

[54] DIGITAL DATA CODING/DECODING METHOD AND APPARATUS

[75] Inventors: Sung-hee Park, Seoul; Yeon-bae Kim, Suwon; Jae-seob Shin, Seoul, all of Rep. of Korea

[73] Assignee: Samsung Electronics Co., Ltd., Suwon, Japan

[21] Appl. No.: 09/053,661

[22] Filed: Apr. 2, 1998

Related U.S. Application Data

[63] Continuation of application No. 08/978,881, Nov. 26, 1997.

[30] Foreign Application Priority Data

Jul. 31, 1997 [KR] Rep. of Korea ............ 97-36520
Nov. 19, 1997 [KR] Rep. of Korea ............ 97-61299

[51] Int. Cl.$^7$ .................................. H03M 7/00
[52] U.S. Cl. ........................................... 341/55
[58] Field of Search ................... 341/55, 51, 52, 341/63

*Primary Examiner*—Brian Young
*Attorney, Agent, or Firm*—Burns, Doane, Swecker & Mathis, L.L.P.

[57] ABSTRACT

A digital data coding/decoding method and apparatus are provided. The coding method includes the steps of representing respective digital data by digits of a predetermined same number, and coding the digital data represented by digits of the same number by a predetermined coding method from the uppermost significant digit sequence to the least significant digit sequence. The method for decoding digital data coded in the order of significance by rating the significance of digits of the digital data, includes the steps of analyzing significance of coded digital data, and decoding the analyzed digital data from upper significant digits to lower significant digits by a predetermined decoding method. Even if some bitstreams are lost or damaged by coding important information first, deterioration in audio quality can be reduced.

24 Claims, 5 Drawing Sheets

FIG. 9A     FIG. 9B     FIG. 9C
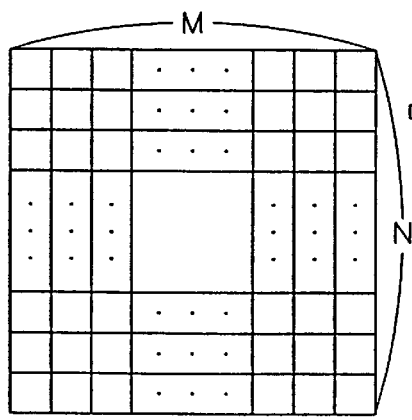 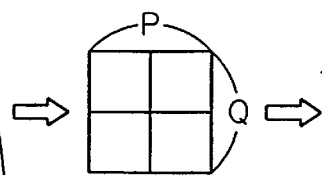 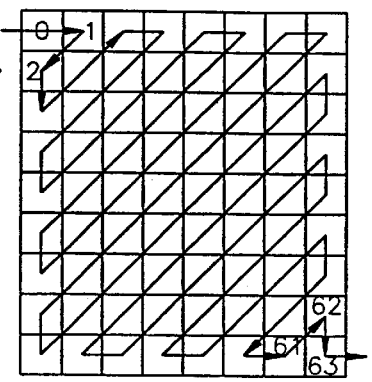
FIG. 9D
FIG. 9E
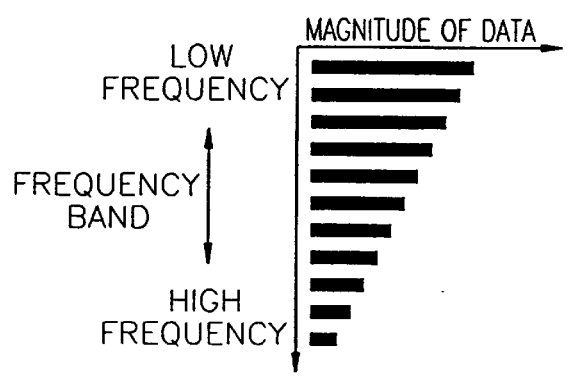

DIGITAL DATA CODING/DECODING METHOD AND APPARATUS

This is a continuing application of U.S. patent application Ser. No. 08/978,881 filed on Nov. 26, 1997, and claims priority of Korean Application Nos. 97-36520 and 97-61299 filed on Jul. 31, 1997 and Nov. 19, 1997, respectively, in Korea, the entire contents of each of which are herein incorporated by reference.

BACKGROUND OF THE INVENTION

1. Field of the Invention

The present invention relates to digital data coding and decoding, and more particularly, to a digital data coding/decoding method and apparatus for coding/decoding digital data sliced into units of digits, in the order of the significance of the digits. The invention has been adopted in ISO/IEC JTC1/SC29/WG11 N1903 (ISO/IEC 14496-3 Subpart 4 Committee Draft).

2. Description of the Related Art

In general, a waveform including information is basically a continuous analog signal. To express the waveform as a discrete signal, analog-to-digital (A/D) conversion is necessary.

To perform the A/D conversion, two procedures are necessary: 1) a sampling procedure for converting a temporally continuous signal into a discrete signal; and 2) quantizing procedure for limiting the number of possible amplitudes to a limited value, that is to say, for converting input amplitude $x(n)$ into an element $y(n)$ belonging to a finite set of possible amplitudes at time n.

Since the quantized signal is simply coded by a PCM (Pulse Code Modulation) method, which does not require another process, it is very convenient to use the quantized data. However, in view of the magnitude of data necessary for storage or transmission, the simple coding method is not optimal even if input samples are statistically independent. Further, if input samples are statistically dependent from one another, the sample coding method is more inappropriate. Thus, coding is performed, including lossless coding such as entropy coding or a certain kind of adaptive quantization. Therefore, the coding procedure becomes very complex, compared to the simple PCM data storing method.

A bitstream includes quantized data and side information for compressing signals. However, such information forms bitstreams by coding the quantized data in the unit of samples in the order of data, without considering the significance of the bits. If the bitstreams are simply stored and then restored without any error, the bitstreams may be generated irrespective of the significance of the bits.

When the bitstreams are transmitted via a communications network, parts of the bitstreams may be lost according to the state of the communications network. Also, if an error is generated during transmission of the bitstreams, the information of the bitstreams after the error is generated is restored as erroneous information, due to propagated error. If only parts of the bitstreams among all transmitted bitstreams are restored as correct information, and more significant signals are restored in the bitstreams restored as correct information compared to unrestored bitstreams, deterioration in quality is to a lesser degree.

According to general coding techniques, a fixed bitrate is given to a coding apparatus, the optimal state for the given bitrate is searched to then perform quantization and coding, thereby forming bitstreams in accordance with the bitrate. In a conventional coding technique, bitstreams having a magnitude suitable for a given bitrate are formed, without considering the order of bitstreams.

Actually, if the thus-formed bitstreams are transmitted via a communications network, the bitstreams are sliced into several slots to then be transmitted. When an overload is applied to a transmission channel, or only parts of slots, not all slots, sent from a transmission end, are received at a reception end due to a restricted bandwidth of the transmission channel, data cannot be reconstructed properly. Also, if only some of the bitstreams are restored, the quality is severely degraded. In the case of digital audio data, sound objectionable to the ear is reproduced. In the case of digital video data, an image reconstructed on the screen is severely impaired.

SUMMARY OF THE INVENTION

To solve the above problems, it is an object of the present invention to provide a digital data coding/decoding method and apparatus for performing coding/decoding in the order of significance of digital data and side information, to restore the data to close to the original data by minimizing quality deterioration with some of the bitstreams.

To accomplish the object, there is provided a method for coding digital data of a predetermined number comprising the steps of: (a) representing the respective digital data by digits of a predetermined same number; and (b) coding the digital data represented by the same number digits from the most significant digit sequences to the least significant digit sequences.

The step (a) is to represent the digital data as binary data having bits of the same number, and the step (b) is to code the represented binary data from the sequences of MSBs to the sequences of LSBs.

The coding step is performed by coupling bits composing the bit sequences into units of bits of a predetermined number.

According to another aspect of the present invention, there is provided a method for coding digital data of a predetermined number, composed of sign data and magnitude data, comprising the steps of: (a) representing the respective digital data by digits of a predetermined same number; (b) coding the most significant digit sequences composed of most significant digits of the magnitude data composing the represented digital data; (c) coding sign data corresponding to non-zero data among the coded most significant digit sequences; (d) coding the most significant digit sequences among uncoded magnitude data of the digital data; (e) coding uncoded sign data among the sign data corresponding to non-zero magnitude data among digit sequences coded in the step (d); and (f) performing the steps (d) and (e) on respective digits of the digital data.

The step (a) is to represent the digital data as binary data having bits of the same number, and digits in the steps (b) through (f) are bits.

The coding steps (b) through (f) are performed by coupling bits composing the respective bit sequences for the magnitude data and sign data, into units of bits of a predetermined number.

To accomplish the above object, there is provided an apparatus for coding a sequence of digital data of a predetermined number, comprising: a bit slicing portion for representing respective digital data by binary data composed of bits of a predetermined same number and slicing the same into units of bits; a coding portion for collecting and coding MSBs among the bit-sliced bits output from the bit slicing portion, and successively collecting and coding upper significant bits; and a bit packing portion for generating bitstreams in the order of significance of the coded data output from the coding portion.

When digital data is composed of sign data and magnitude data, the coding portion collects and codes the magnitude data for bits having the same significance level among the bit-sliced data, codes uncoded sign data among the sign data corresponding to non-zero magnitude data, the magnitude and sign data coding is performed sequentially from the MSBs to lower significant bits.

When the coding portion collects and codes the bits according to significance, coding is performed by coupling the bits in a predetermined number unit.

Also, there is provided a method for decoding for decoding digital data coded in the order of significance by rating the significance of digits of the digital data, comprising the steps of: analyzing the significance of the coded digital data; and decoding the analyzed digital data by a predetermined decoding method from upper significant digits to lower significant digits.

The digits are bits. The decoding step comprises the steps of: losslessly decoding the analyzed digital data from upper significant bits to lower significant bits in the unit of vectors; and restoring bit-sliced data from the data decoded in the unit of vectors.

Further, to accomplish the above object, there is provided a method for decoding digital data coded in the order of significance by rating the significance of digits of the digital data, comprising the steps of: (a) analyzing the significance of the coded digital data; (b) decoding the magnitude data of the analyzed digital data as a predetermined decoding method from upper significant digits to lower significant digits; and (c) decoding the sign data of the analyzed digital data to combine the decoded sign data with the decoded magnitude data.

The digits are bits. The step (b) comprises the steps of: losslessly decoding the analyzed digital data from upper significant bits to lower significant bits in the unit of vectors; and restoring bit-sliced data from the data decoded in the unit of vectors.

Also, there is provided an apparatus for decoding digital data coded in the order of significance by rating the significance of bits of the digital data, comprising: a bitstream analyzing portion for analyzing bit significance of bitstreams of the coded digital data; a decoding portion for decoding the analyzed digital data from upper significant digits to lower significant digits; and a bit coupling portion for coupling information for bits of respective samples from the decoded data output from the decoding portion and restoring the digital data of the respective samples.

The decoding portion comprises: a magnitude data decoding portion for decoding the magnitude data of the analyzed digital data by a predetermined decoding method from upper significant digits to lower significant digits; and a sign data decoding portion for decoding the sign data of the analyzed digital data and combining the decoded sign data with the decoded magnitude data.

The decoding portion losslessly decodes the analyzed digital data in the unit of vectors from upper significant bits to lower significant bits and restores the bit-sliced data.

According to another aspect of the present invention, there is provide an audio coding apparatus comprising: time/frequency mapping portion for converting an input audio signal of a temporal domain into a signal of a frequency domain; a quantizing portion for quantizing the frequency domain signal for each frequency band; a bit slicing portion for slicing the quantized data in the unit of bits; a coding portion for collecting and coding the MSBs among the bit-sliced data output from the bit slicing portion, and successively collecting and coding bits sequentially from upper significant bits; and a bitstream generating portion for generating bitstreams in the order of significance of bits from the coded data and side information for the coded data.

The bitstreams generating portion generates bitstreams sequentially from low frequency to high frequency.

Also, there is provided an audio coding method comprising the steps of: slicing audio data quantized for each predetermined frequency band into units of bits; collecting and coding MSBs among the bit-sliced data and successively collecting and coding bits sequentially from upper significant bits; and generating bitstreams in the order of significance of bits from the coded data and side information for the coded data.

The bitstreams are generated sequentially from low frequency to high frequency, and from upper significant bits to lower significant bits.

Further, there is provided an apparatus for decoding bitstreams of coded audio data, comprising: a bitstream analyzing portion for analyzing significance of bits composing the bitstreams; a decoding portion for decoding side information having at least quantization bits and quantization step size, and quantized data, from upper significant bits to lower significant bits, according to significance analyzed by the bitstream analyzing portion; an inverse quantizing portion for restoring the decoded quantization step size and quantized data into signals having the original magnitudes; and a frequency/time mapping portion for converting inversely quantized signals into signals of a temporal domain.

According to another aspect of the present invention, there is provided a method for decoding audio data, comprising the steps of: analyzing the significance of bits composing the bitstreams, and decoding side information having at least quantization bits and quantization step size, and quantized data, from upper significant bits to lower significant bits; restoring the decoded quantization step size and quantized data into signals having the original magnitudes; and converting inversely quantized signals into signals of a temporal domain.

Alternatively, there is provided an apparatus for coding video data, comprising: a DCT portion for performing DCT on an input video signal; a quantizing portion for quantizes the DCT performed data; a bit packing portion for dividing side information and quantized value information into units of bits, according to the significance of quantized data, and generating bitstreams.

Also, according to another aspect of the present invention, there is provided a video coding method comprising the steps of: quantizing a DCT performed input video signal; dividing side information and quantized value information into units of bits, according to the significance of quantized data; and coding bit-sliced data in the order of the significance and generating bitstreams.

Also, according to the present invention, there is provided a video decoding apparatus for decoding bitstreams of coded video data, comprising: a bitstream analyzing portion for analyzing the significance of bits composing the bitstreams; a decoding portion for decoding side information having at least quantization bits and quantization step size, and quantized data, from upper significant bits to lower significant bits, according to the significance analyzed by the bitstream analyzing portion; an inverse quantizing portion for restoring the decoded quantization step size and quantized data into the signals having the original magnitudes; and an IDCT portion for performing inverse DCT on the inversely quantized signals.

The coding portion performs coding sequentially from low frequency to high frequency.

A video decoding method for decoding bitstreams of coded video data, comprises the steps of: analyzing the significance of bits composing the bitstreams and, and decoding side information having at least quantization bits and quantization step size, and quantized data, from upper significant bits to lower significant bits; restoring the decoded quantization step size and quantized data into signals having the original magnitudes; and performing inverse DCT on the inversely quantized signals.

The invention may also be embodied in a general purpose digital computer that is running a program from a computer usable medium including but not limited to storage media such as magnetic storage media (e.g., ROM's, floppy disks, hard disks, etc.), optically readable media (e.g., CD-ROMs, DVDs, etc.) and hybrid disks (magneto optical disks) and carrier waves (e.g., transmissions over the Internet). For instance, the present invention may be embodied in a computer readable medium having thereon a computer program for execution by a computer, e.g., for coding a sequence of digital data of a predetermined number, the computer program being executable by a machine to perform: (a) representing the respective digital data by digits of a predetermined same number; and (b) coding the digital data represented by the same number digits from the most significant digit sequences to the least significant digit sequences.

Also, the present invention can be embodied in a computer readable medium having thereon a computer program for coding a sequence of digital data of a predetermined number, the computer program being executable by a machine to perform: (a) representing the respective digital data by digits of a predetermined same number; (b) coding the most significant digit sequences composed of most significant digits of the magnitude data composing the represented digital data; (c) coding sign data corresponding to non-zero data among the coded most significant digit sequences; (d) coding the most significant digit sequences among uncoded magnitude data of the digital data; (e) coding uncoded sign data among the sign data corresponding to non-zero magnitude data among digit sequences coded in the step (d); and (f) performing the steps (d) and (e) on respective digits of the digital data.

Further, the present invention can be embodied in a computer readable medium having thereon a computer program for decoding in the order of significance by rating the significance of digits of the digital data, the computer program being executable by a machine to perform: analyzing the significance of the coded digital data; and decoding the analyzed digital data by a predetermined decoding method from upper significant digits to lower significant digits.

Additionally, the present invention can be embodied in a computer readable medium having embodied thereon a computer program for decoding digital data coded in the order of significance by rating the significance of digits of the digital data, the computer program being executable by a machine to perform: (a) analyzing the significance of the coded digital data; (b) decoding the magnitude data of the analyzed digital data as a predetermined decoding method from upper significant digits to lower significant digits; and (c) decoding the sign data of the analyzed digital data to combine the decoded sign data with the decoded magnitude data.

Further, the present invention can be embodied in a computer readable medium having thereon a computer program for audio coding, the computer program being executable by a machine to perform: slicing audio data quantized for each predetermined frequency band into units of bits; collecting and coding MSBs among the bit-sliced data and successively collecting and coding bits sequentially from upper significant bits; and generating bitstreams in the order of significance of bits from the coded data and side information for the coded data.

Furthermore, the present invention can be embodied in a computer readable medium having thereon a computer program for decoding bitstreams of coded audio data, the computer program being executable by a machine to perform: analyzing the significance of bits composing the bitstreams, and decoding side information having at least quantization bits and quantization step size, and quantized data, from upper significant bits to lower significant bits; restoring the decoded quantization step size and quantized data into signals having the original magnitudes; and converting inversely quantized signals into signals of a temporal domain.

The present invention can also be embodied in a computer readable medium having thereon a computer program for video coding, the computer program being executable by a machine to perform: quantizing a DCT performed input video signal; dividing side information and quantized value information into units of bits, according to the significance of quantized data; and coding bit-sliced data in the order of the significance and generating bitstreams.

The present invention can be additionally embodied in a computer readable medium having thereon a computer program for decoding bitstreams of coded video data, the computer program being executable by a machine to perform: analyzing the significance of bits composing the bitstreams and, and decoding side information having at least quantization bits and quantization step size, and quantized data, from upper significant bits to lower significant bits; restoring the decoded quantization step size and quantized data into signals having the original magnitudes; and performing inverse DCT on the inversely quantized signals.

BRIEF DESCRIPTION OF THE DRAWINGS

The above objects and advantages of the present invention will become more apparent by describing in detail a preferred embodiment thereof with reference to the attached drawings in which:

FIGS. 9A–9E show a video signal processing procedure in a video coding apparatus.

DESCRIPTION OF THE PREFERRED EMBODIMENT(S)

Hereinbelow, preferred embodiments of the present invention will be described in detail with reference to the accompanying drawings.

First, the overall concept of the coding apparatus will be described. An input digital signal is generated as bitstreams through the coding apparatus shown in FIG. 1. Upper significant bits are first coded to form bitstreams. In other words, the coding priority of data components to be coded is determined by relative significance of the components. Higher priority components are prioritized over lower priority components. Since important information is first coded, if the bits used heretofore are greater than or equal to the bit generation allowance, coding is terminated at that moment and generation of bitstreams is completed. If generation of bitstreams is terminated in the middle of coding, data is partially lost in restoring the same in a decoder so that original digital data is distorted. However, since important information is coded first, even if bitstreams are not fabricated in the middle of coding, the overall coding performance can be maintained to be similar to that of the conventional technique.

Figure 2:
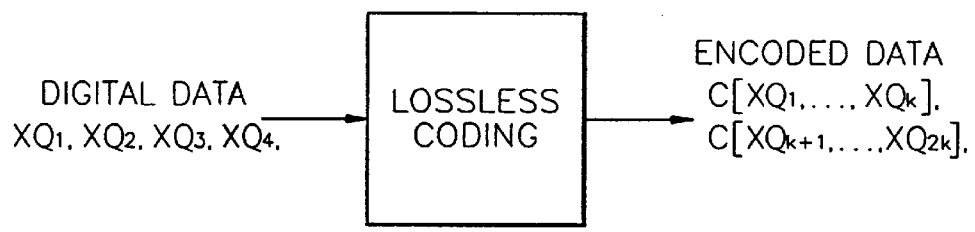
FIG. 2 is a conceptual diagram showing a conventional digital coding procedure.

FIG. 2 shows a conventional coding method. According to the conventional coding method, coding is sequentially performed, irrespective of significance. Thus, if only parts of bitstreams from the forehand bitstreams among all bitstreams are to be used, the information less important than other information included in the unused backhand bitstreams is included in large quantity in the used bitstreams.

Figure 3:
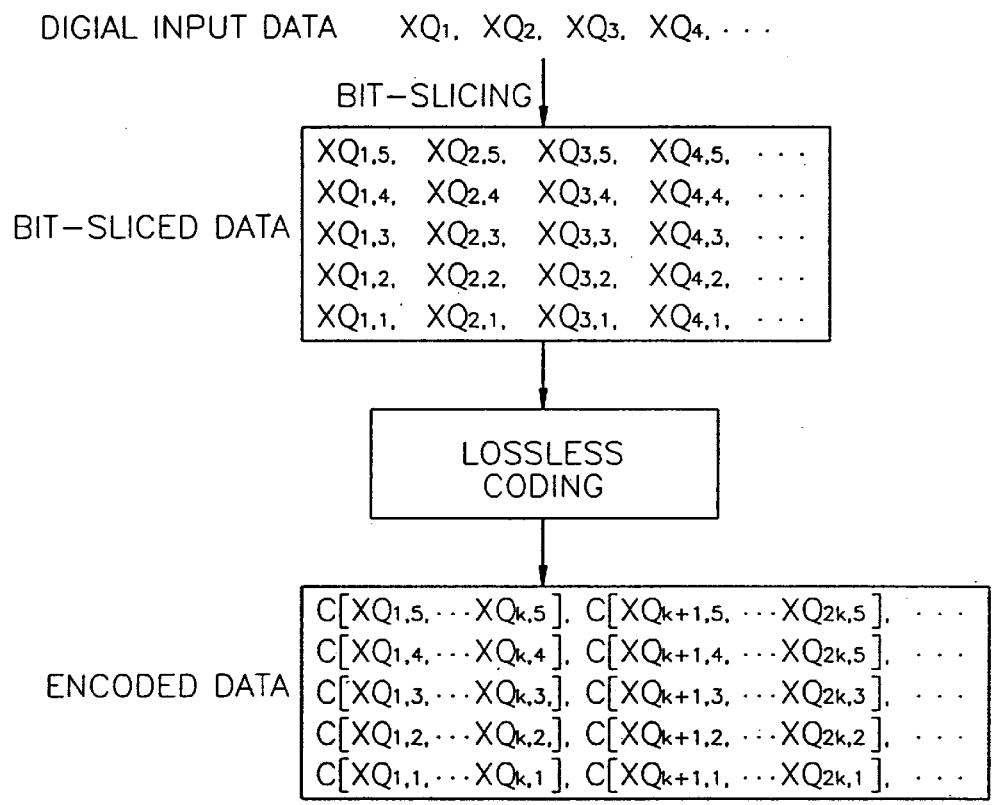
FIG. 3 is a conceptual diagram showing a digital coding procedure according to the present invention.

For the foregoing reason, in the present invention, digital data is sliced into units of bits, as shown in FIG. 3. Generally, the significance of a 1-bit MSB (most significant bit) is far higher than that of a 1-bit LSB (least significant bit). Thus, since upper significant quantization bits are determined to be more important, coding is performed from the MSB to the LSB.

Figure 1:
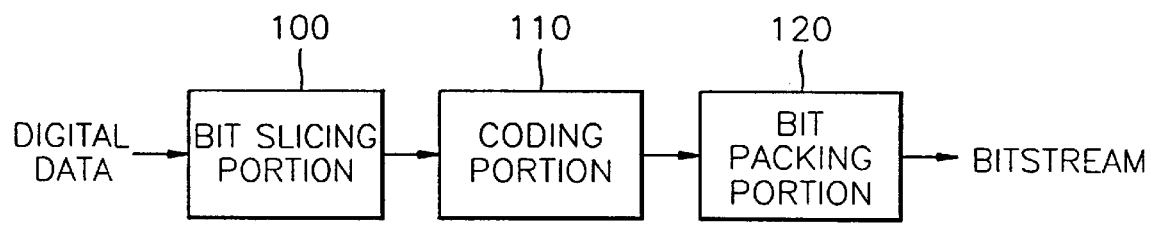
FIG. 1 is a block diagram of a digital coding apparatus according to the present invention.

FIG. 1 is a block diagram of a digital data coding apparatus according to the present invention, which includes a bit slicing portion 100, a coding portion 110 and a bit packing portion 120. Here, the digital data is composed of binary data and represented by sequences of bits of the same number of bits. Also, digital data not represented by sequences with the same number bits, is made to be represented by sequences with the same number bits. Although the digital data is restricted to binary data in this embodiment, the data may be decimal data or hexadecimal data, other than the binary data. In such a case, the digital data is represented in units of digits (not bits).

The bit slicing portion 100 slices a sequence of digital data into units of bits. First, the value of a sign of digital data is stored, and the absolute value of the digital data is taken so that the sign of all data becomes positive. When the data taken with the absolute value is represented by binary data, as shown in FIG. 3, the values corresponding to respective bits are separately sliced according to the position of the respective bits and the data corresponding to the respective bits are collected to generate new sequences. For example, if input digital data is −31, 12, −9, 7, 17, −23, . . . , the absolute value for each data is taken to obtain digital data as 31, 12, 9, 7, 17, 23, . . . , to then be represented by binary notation to become 11111, 01100, 01001, 00111, 10001, and 10111, respectively.

Among the values represented by the binary data, the information for the respective bits is sliced to then collect the same sequentially, thereby generating new sequences. First, the data for respective MSBs are collected, that is, 1, 0, 0, . . . for 31, 12, 9, . . . , respectively. Therefore, the bit-sliced data corresponding to the respective MSBs are 1, 1, 1, 0, 0, 0, . . . . Subsequently, the sequences corresponding to the respective bits can be obtained. Finally, the sequences of the LSBs are 1, 0, 1, 1, 1, 1, . . .

The coding portion 110 collects the respective MSBs of the bit-sliced binary data output from the bit slicing portion 100 and codes the same. Successively, the coding portion 110 collects bits from upper significant ones and codes the same. The bits having the highest significance are preferably the respective MSBs of the respective digital data represented by binary data, and the bits having the lowest significance are preferably the respective LSBs. Coding is performed using a lossless coding algorithm suitable for storing or transmitting the data in one embodiment.

Generally, to compress data more efficiently, the data for MSBs are sequentially collected, and several data are coupled to form a vector. The MSBs are formed by vectors, and these vectors are coded by a lossless coding method. The lossless coding method can be Arithmetic coding or Huffman coding. Then, the next uppermost significant bits are collected to then be coded, which is a bit-sliced coding method.

When the digital data is composed of sign data and magnitude data, the coding portion 110 collects each magnitude data for the MSBs among the data sliced from the bit slicing portion 100, codes the same, and then codes the sign data corresponding to non-zero magnitude data among the coded magnitude data. This procedure is performed down to the LSB, with only uncoded sign data being coded.

In the present invention, since the absolute values for the respective sample values are taken, the information for the sign value of either positive or negative must be coded first or later. In this case, coding the sign value first results in coding less information first. Since the values quantized from the MSB to the first upper bit being 1 are regarded as zero, the sign values thereof are meaningless. In other words, if a quantized value is represented by 5 bits of 00011 and only 3 upper bits are used, the quantized value is restored as 00000. Therefore, even if this value has a sign bit, the information is useless. However, if 4 bits among 5 bits are used, the quantized value becomes 00010. Thus, the sign value becomes considerably more meaningful because the value of 1 which comes first in upper bits means that the quantized value is decoded to a value other than zero.

In representing respective frequency components from respective MSBs, if 1, not 0, comes first, the sign value is coded prior to coding another value, depending on whether the sign value is positive or negative.

For example, it is assumed that eight quantized values each having four bits are represented by binary notation as follows:

|      | MSB ↓ |   |   | LSB ↓ |
| ---- | ----- | - | - | ----- |
| 0:   | 1     | 0 | 0 | 1     |
| 1:   | 0     | 0 | 0 | 1     |
| 2:   | 1     | 0 | 1 | 0     |
| 3:   | 0     | 1 | 0 | 0     |
| 4:   | 0     | 0 | 0 | 0     |
| 5:   | 0     | 0 | 0 | 1     |
| 6:   | 0     | 0 | 0 | 0     |
| 7:   | 0     | 0 | 1 | 1     |

In coding the MSB, 1010 . . . is first coded and then it is determined whether it is necessary to code the sign bit. At this time, since a non-zero value is first coded in the first and third frequency components, the sign bits for these two components are sequentially coded to then code 0000.

The bit packing portion 120 generates bitstreams having a desired magnitude in the coding order, from the data coded by the coding portion 110 depending on significance. First, the coded data of the bit-sliced information for the MSBs are generated as bitstreams, and the information for the sign is then coded in the above-described order to then be added to the bitstreams, thereby generating overall bitstreams.

Figure 4:
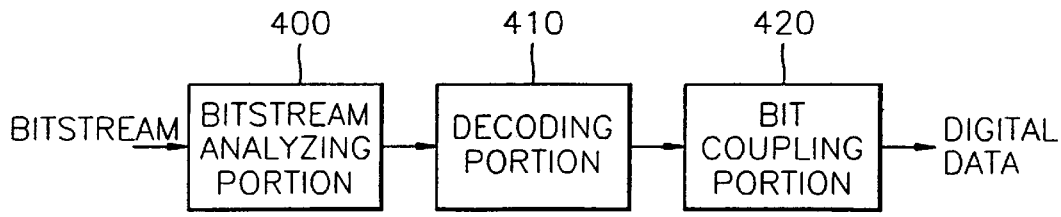
FIG. 4 is a block diagram of a decoding apparatus according to the present invention.

The bitstreams generated through the coding procedure are restored into original digital data through a decoding procedure, as shown in FIG. 4. As more significant data are first coded to produce bitstreams in the present invention, a decoder also interprets the bitstreams in the order of significance, i.e., in the generated order, to perform decoding.

FIG. 4 is a block diagram of a digital data decoding apparatus according to the present invention, which includes a bitstream analyzing portion 400, a lossless decoding portion 410, a bit coupling portion 420.

The bitstream analyzing portion 400 analyzes coded data among input bitstreams, depending on significance. The bitstreams are generated from the data coded in the coding apparatus depending on the significance of the data. Thus, also in the decoding apparatus, the bitstreams are analyzed sequentially from the forehand bitstream, depending on significance. The coded data for the bit-sliced information for the MSBs are first analyzed from the bitstreams, and the information for the sign is then analyzed in the above-described order. The analyzed coded data is transmitted to the lossless decoding portion 410 and the sign information is transmitted to the bit coupling portion 420, to then be used in restoring the original signal.

The lossless decoding portion 410 decodes the bit-sliced signals among the signals output from the bitstream analyzing portion 400, from uppermost significant bits to lower significant bits. The bit-sliced data can be restored from the coded data through a reverse procedure of the algorithm adopted in the coding apparatus for coding the bit-sliced data, i.e., a decoding procedure. To compress data more efficiently, the data for MSBs are sequentially collected, and several data are coupled to form vectors. Then, these vectors are coded by a lossless coding method. Thus, these vectors are decoded from the coded data, and bit-sliced data for the respective samples are restored from the decoded vectors.

The bit coupling portion 420 restores the bit information of the respective samples sequentially from the MSB information to the LSB information, from the bit-sliced binary data restored in the lossless decoding portion 410, and produces the original digital data. The values corresponding to the positions of the respective bits of the digital data of the respective samples are replenished by the data corresponding to the respective decoded bits, thereby obtaining the values taken as absolute values of the original data.

In the sign information for the respective samples obtained from the bitstream analyzing portion 400, if the sign is negative, the absolute value is multiplied by −1 to make the value negative.

For example, assuming that the sequence for the decoded MSBs is 1, 0, 0, 0, 1, 1, . . . , if 5 bits are used in representing digital data, the digital data are restored as $10000_{(2)}$, $00000_{(2)}$, $00000_{(2)}$, $00000_{(2)}$, $10000_{(2)}$, $10000_{(2)}$, . . . from the restored bit-sliced data. Then, the sequence of the next upper significant bits is restored. If the sequence of the next upper significant bits is 1, 1, 1, 0, 0, 0, . . . , the restored digital data are $11000_{(2)}$, $01000_{(2)}$, $01000_{(2)}$, $00000_{(2)}$, $10000_{(2)}$, $10000_{(2)}$, . . . In such a manner, restoration is continuously performed up to the bit-sliced data for the LSBs and the sign information, thereby restoring the originally input data.

Figure 5:
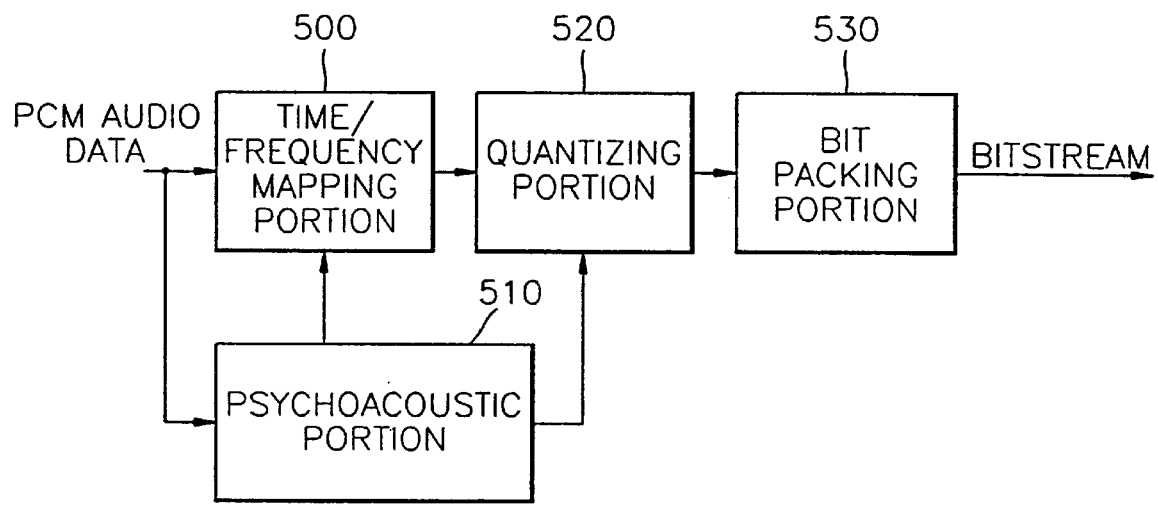
FIG. 5 is a block diagram of an audio coding apparatus according to the present invention.

FIG. 5 is a block diagram of an audio coding apparatus according to the present invention, which includes a time/frequency mapping portion 500, a psychoacoustic portion 510, a quantizing portion 520, and a bit packing portion 530.

The time/frequency mapping portion 500 converts an audio signal of a temporal domain into a signal of a frequency domain. The psychoacoustic portion 510 couples the audio signal converted into the frequency domain signal by signal components of proper frequency bands, and calculates a masking threshold value at each frequency band. The quantizing portion 520 quantizes the frequency domain signal in each frequency band so that the magnitude of quantization noise is smaller than the masking threshold value calculated by the psychoacoustic portion 510. The bit packing portion 530 codes side information and the quantized frequency domain signal components in each frequency band to generate bitstreams.

The main feature of the present invention is the bit packing portion 530 for generating bitstreams by coding the quantized data in the audio coding apparatus. The digital data coding method according to the present invention can be applied to the audio coding apparatus shown in FIG. 5 for coding the quantized data.

Prior to quantization of the audio signal by the audio coding apparatus, first, the psychoacoustic portion 510 produces, using a psychoacoustic model, block types (long blocks, start blocks, short blocks, stop blocks, etc.) of the frames of input data being currently processed, SMR (Signal to Masked Threshold Ratio) values of the respective quantization bands, domain information in the case of short blocks, or time-delayed PCM data to match the synchronization of the psychoacoustic model and time/frequency, to transmit the same to the time/frequency mapping portion 500. Model 2 of ISO/IEC 11172-3 is used in calculating the psychoacoustic model. The time/frequency mapping portion 500 converts data of a temporal domain into data of a frequency domain, using a modified DCT (MDCT) depending on the block type output from the psychoacoustic portion 510. Here, the block size is 2048 for a long/start/stop block and 256 for a short block, and MDCT is performed 8 times. The procedure hereto is the same as that used in the conventional MPEG-2 NBC.

The quantizing portion 520 couples frequency components of the data converted into that of a frequency domain by the quantization bands demonstrated in Table 1, and quantizes the same while increasing the step size so that the SNR (signal-to-noise ratio) value of the quantization band becomes smaller than the SMR value output from the psychoacoustic portion 510. The quantization is performed by scala quantization, and the basic quantization step size is $2^{1/4}$. The quantization is performed so that the NMR value is less than 0 dB. The obtained output is information for the quantized data and the quantization step size of each processed band. To code the quantized signals, the quantized signal having the largest absolute value is searched for in each coding band, and then the largest quantization bit necessary for coding is calculated.

TABLE 1

| Quantization band | Coding band | Start index | End index |
|---|---|---|---|
| 0 | 0 | 0 | 7 |
| 1 |   | 8 | 15 |
| 2 |   | 16 | 23 |
| 3 | 1 | 24 | 35 |
| 4 |   | 36 | 47 |
| 5 | 2 | 48 | 59 |
| 6 |   | 60 | 71 |
| 7 | 3 | 72 | 83 |
| 8 |   | 84 | 99 |
| 9 | 4 | 100 | 115 |
| 10 |   | 116 | 131 |
| 11 | 5 | 132 | 147 |
| 12 |   | 148 | 163 |
| 13 | 6 | 164 | 195 |
| 14 | 7 | 196 | 227 |
| 15 | 8 | 228 | 259 |
| 16 | 9 | 260 | 291 |
| 17 | 10 | 292 | 323 |
| 18 | 11 | 324 | 354 |
| 19 | 12 | 356 | 387 |
| 20 | 13 | 388 | 419 |
| 21 | 14 | 420 | 451 |
| 22 | 15 | 452 | 483 |
| 23 | 16 | 484 | 515 |
| 24 | 17 | 516 | 555 |
| 25 | 18 | 556 | 599 |
| 26 | 19 | 600 | 634 |
| 27 | 20 | 644 | 687 |

Figure 6:
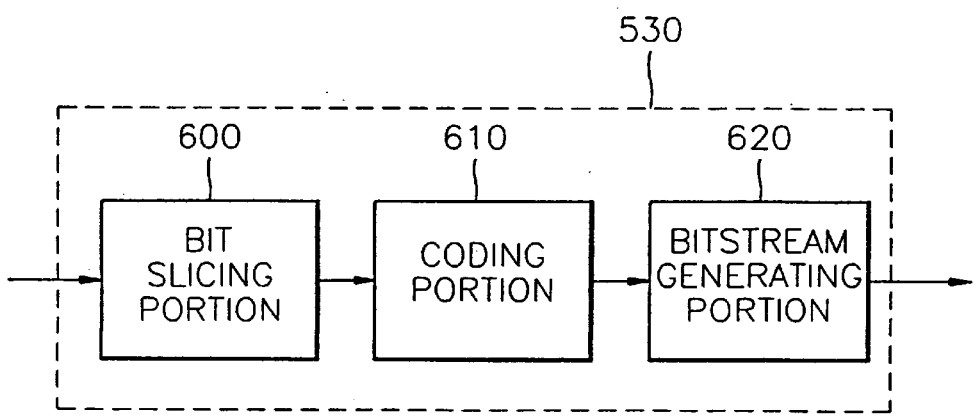
FIG. 6 is a detailed block diagram of a bit packing portion shown in FIG. 5.

FIG. 6 is a detailed block diagram of a bit packing portion 530 to which the quantized digital data coding method according to the present invention is applied, which includes a bit slicing portion 600, a coding portion 610, and a bitstream generating portion 620.

The bit slicing portion 600 slices the quantized data output from the quantizing portion 520 into units of bits. The coding portion 610 collects the MSBs among the bit-sliced data output from the bit-sliced data, and codes the same. Successively, bits are collected in the order of upper bits to then be coded. The bit generating portion 620 generates bitstreams for the coded data output from the coding portion 610 and side information on the coded data in the order of significance of bits.

The operation of coding side information and quantized data, occurring in the bit slicing portion 600 and the coding portion 610, will now be described. Synchronization signals of the bitstreams are added to the bitstreams to produce information for the start of the bitstreams. Then, the magnitude of the overall bitstreams is coded. Next, a block type must be coded. The subsequent coding process may be slightly different depending on block types. To code input signals of a frame, according to signal characteristics, a long block may be converted, or 8 shorter blocks may be converted. Since the block size is changed in such a way, the coding becomes slightly different.

First, the maximum quantization bit value is obtained from the quantized signals in each coding band and coding is performed from the maximum quantization bit value by the bit-sliced coding method proposed in the present invention. Then, the quantization step size information of the quantization band output during quantization is coded. To code the quantization bit or quantization step size information, the minimum and maximum values of the quantization bit or quantization step size are obtained to then obtain the difference between these two values, thereby obtaining the number of necessary bits. In practice, prior to coding the side information, the minimum value and the magnitude necessary for representing bits are first coded by arithmetic coding and then stored in the bitstreams. When coding is actually performed later, the difference between the minimum value and side information is coded. Then, the next quantized signals are sequentially coded.

To code the quantized signal, a bit-sliced coding method can be used by which the respective quantized signals are coupled into units of bits, bits having the same significance are coupled to form vectors and then these vectors are coded. When sign information of the respective samples is necessary in the course of coding the quantized signals, sign information is also coded. If the bit quantity used heretofore becomes larger than or equal to the allowed bit quantity in the course of coding depending on significance, coding is terminated at that moment, to complete bitstreams. Therefore, the overall complexity can be greatly lowered, compared to the conventional coding method. However, to perform coding more efficiently, irrespective of the complexity, the magnitude of the quantity of bits generated after coding by increasing the step size of each quantization band appropriately when the used bits become greater than the allowed bits. The overall coding efficiency can be improved by repeating the quantization and coding until the generated bit quantity becomes less than the allowed bit quantity.

Similarly, eight short blocks produced by dividing a long block, having a magnitude one eighth that of the long block, undergo temporal/frequency mapping and quantization and then lossless coding is performed on the quantized data. Here, the quantization is not performed separately on each of eight blocks. Instead, using the information for eight blocks separated into three sections, sent from the psychoacoustic portion, the quantization bands in these sections, demonstrated in Table 2, are collected, to then be processed just like one band, in the long block. Thus, the quantization step size information for each band in these three sections can be obtained. First, the quantization bit information is coded, and then the maximum quantization bit is obtained. Then, bit-sliced coding according to the present invention is performed, as with the long block. If the quantization bit of a certain band is smaller than that being currently coded, coding is not performed. When the quantization bit of a certain band becomes equal to that being currently coded, coding is performed. When a band is coded, the step size information for the quantization band is first coded and then the values corresponding to the quantization bits among the quantized frequency components are sampled to then be coded.

TABLE 2

| Coding band | Quantization band | Start index | End index |
|---|---|---|---|
| 0 | 0 | 0 | 3 |
| 1 | 1 | 4 | 7 |
| 2 | 2 | 8 | 11 |
| 3 | 3 | 12 | 15 |
| 4 | 4 | 16 | 19 |
| 5 | 5 | 20 | 23 |

TABLE 2-continued

| Coding band | Quantization band | Start index | End index |
|---|---|---|---|
| 6 | 6 | 24 | 27 |
| 7 |   | 28 | 31 |
| 8 | 7 | 32 | 35 |
| 9 |   | 36 | 39 |
| 10 | 8 | 40 | 43 |
| 11 |   | 44 | 47 |
| 12 | 9 | 48 | 51 |
| 13 |   | 52 | 55 |
| 14 |   | 56 | 59 |
| 15 | 10 | 60 | 63 |
| 16 |   | 64 | 67 |
| 17 |   | 68 | 71 |
| 18 | 11 | 72 | 75 |
| 19 |   | 76 | 79 |
| 20 |   | 80 | 83 |
| 21 |   | 84 | 87 |

Throughout this procedure, coding is performed in the order of significance, and bitstreams are generated in the bitstream generating portion 620. In other words, the sync information, frame magnitude, block type, quantization bit for each coding band, quantization step size for each quantization band and quantized audio signals are coded in the order from the MSBs to the LSBs, to generate bitstreams.

Figure 7:
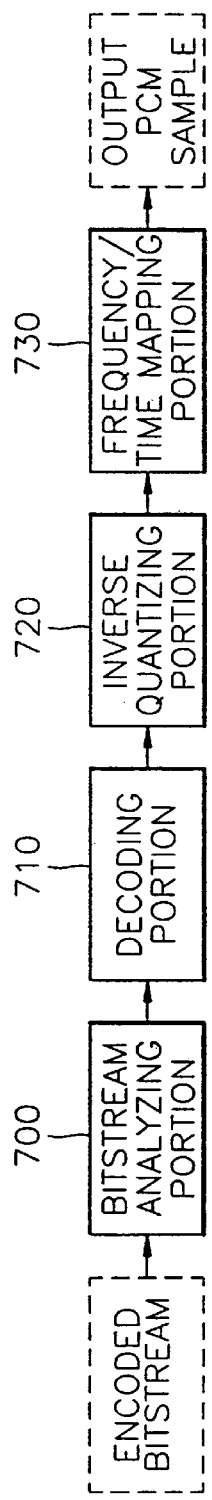
FIG. 7 is a block diagram of an audio decoding apparatus according to the present invention.

FIG. 7 is a block diagram of an audio decoding apparatus for decoding bitstreams generated by the audio coding apparatus, which includes a bitstream analyzing portion 700, a decoding portion 710, an inverse quantizing portion 720, and a frequency/time mapping portion 730.

The order of decoding audio bitstreams by the audio decoding apparatus is reverse to that of the coding procedure of the audio coding apparatus. The bitstream analyzing portion 700 analyzes the significance of bits composing the bitstreams. The decoding portion 710 for decoding quantization bits, quantization step size, or quantized data, in the generated order of bitstreams input from the audio coding apparatus, decodes side information having at least quantization bits and quantization step size, and quantized data, from upper significant bits to lower significant bits, according to significance analyzed by the bitstream analyzing portion 700. The inverse quantizing portion 720 restores the decoded quantization step size and quantized data into the signals having original magnitudes. The frequency/time mapping portion 730 converts inversely quantized signals into signals of a temporal domain so as to be reproduced by a user.

Figure 8:
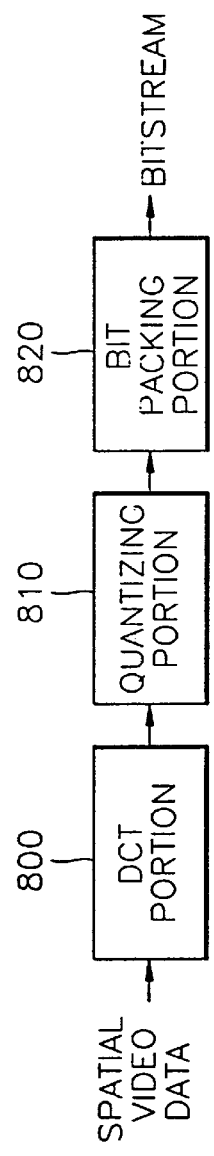
FIG. 8 is a block diagram of a video coding apparatus according to the present invention.

FIG. 8 is a block diagram of a video coding apparatus, which includes a DCT portion 800, a quantizing portion 810, and a bit packing portion 820. The feature of the present invention is the bit packing portion 820 for generating bitstreams by coding the quantized data by the video coding apparatus. The method for coding quantized digital data according to the present invention can be applied to the audio coding apparatus shown in FIG. 8.

The DCT portion 800 performs DCT on a video signal of a spatial domain, having an arbitrary magnitude, into data of a frequency domain. The quantizing portion 810 quantizes the converted frequency domain data. The bit packing portion 820 divides side information and quantized value information into units of bits, according to the significance of video data to be coded, and codes the same sequentially from low frequency to high frequency to generate bitstreams.

As shown in FIG. 8, the frequency domain data is obtained using DCT from a spatial domain video signal having an arbitrary magnitude and then quantization is performed to an appropriate degree through a quantizer, to arrange quantized data, as shown in FIG. 9.

M×N spatial domain data having the data format shown in FIG. 9A is partitioned into arbitrary Px! blocks (generally, 16×16), as shown in FIG. 9B. Then, the Px! blocks are divided into four subblocks (generally 8×8) having the same magnitude. Thereafter, DCT is performed by the DCT portion 800 to convert the spatial domain data into frequency domain data, thereby obtaining coefficients of frequency components having 64 bands, as shown in FIG. 9C. The obtained coefficients are denoted as $F_i$ (i=0, 1, 2, ..., 63), and quantized by the quantizing portion 810. The quantized data are denoted as $P(F_i)$, and arranged in a one-dimensional array, as shown in FIG. 9D. Generally, low frequency components exist in most blocks, but high frequency components exist only in a few blocks. Thus, the magnitude of data is as shown in FIG. 9E.

The quantized data are arranged in such a way, and then the digital coding method according to the present invention can be applied to the rearranged quantized data through the bit packing portion 820. Then, original quantized data can be efficiently coded according to significance, thereby generating bitstreams.

Figure 10:
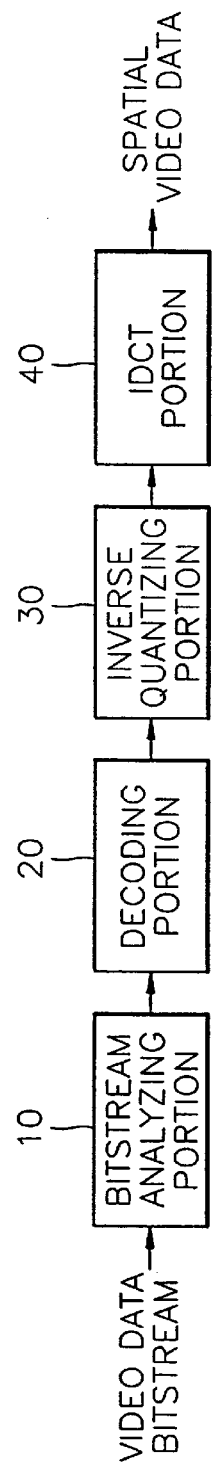
FIG. 10 is a block diagram of a video decoding apparatus according to the present invention.

FIG. 10 is a block diagram of a video decoding apparatus for decoding the bitstreams coded by the video coding apparatus, which includes a bitstream analyzing portion 10, a decoding portion 20, an inverse quantizing portion 30 and an IDCT portion 40.

The bitstream analyzing portion 10 analyzes the significance of bits composing coded bitstreams. The decoding portion 20 decodes side information having at least quantization bits and quantization step size and quantized data, from upper significant bits to lower significant bits, according to the significance analyzed by the bitstream analyzing portion 10. In other words, the bitstreams generated by the video coding apparatus are received, bit-sliced quantized data are decoded according to significance by the method proposed in the present invention, and the quantized data of respective frequency components are coupled by the decoded data. The coupled quantized data of 64 frequency components are rearranged in an order reverse to that in the coding apparatus, thereby converting the same into quantized data of frequency components for original subblocks. The inverse quantizing portion 30 restores the decoded quantization step size and quantized data as signals having the original magnitudes. The IDCT portion 40 performs IDCT on the inversely quantized signals to restore spatial domain video signals.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium having computer readable program code means embodied therein for coding a sequence of digital data of a predetermined number, the computer readable program code means in said computer usable medium comprising: (a) computer readable program code means for causing a computer to effect representing the respective digital data by digits of a predetermined same number; and (b) computer readable program code means for causing a computer to effect coding the digital data represented by the same number digits from the most significant digit sequences to the least significant digit sequences, for instance. A functional program, code and code segments, used to implement the present invention can be derived by a skilled computer programmer from the description of the invention contained herein.

According to the present invention, important information is first coded, thereby reducing deterioration in audio quality even if some of bitstreams are lost or damaged.

Also, the novel method for losslessly coding digital data according to the present invention is compatible with the conventional lossless coding method.

Further, since more important information is first coded, the present invention can be applied to coding various types of signals, such as audio signals or video signals.

What is claimed is:

1. A computer usable medium having computer readable program code means embodied therein for coding a sequence of digital data of a predetermined number, the computer readable program code means in said computer usable medium comprising:
   (a) computer readable program code means for causing a computer to effect representing the respective digital data by digits of a predetermined same number; and
   (b) computer readable program code means for causing a computer to effect coding the digital data represented by the same number digits from the most significant digit sequences to the least significant digit sequences.

2. The computer usable medium according to claim 1, wherein means (a) is to represent the digital data as binary data having bits of the same number, and means (b) is to code the represented binary data from the sequences of MSBs to the sequences of LSBs.

3. The computer usable medium according to claim 2, wherein the coding means is performed by coupling bits composing the bit sequences into units of bits of a predetermined number.

4. A computer usable medium having computer readable program code means embodied therein for coding a sequence of digital data of a predetermined number, composed of sign data and magnitude data, the computer readable program code means in said computer usable medium comprising:
   (a) computer readable program code means for causing a computer to effect representing the respective digital data by digits of a predetermined same number;
   (b) computer readable program code means for causing a computer to effect coding the most significant digit sequences composed of most significant digits of the magnitude data composing the represented digital data;
   (c) computer readable program code means for causing a computer to effect coding sign data corresponding to non-zero data among the coded most significant digit sequences;
   (d) computer readable program code means for causing a computer to effect coding the most significant digit sequences among uncoded magnitude data of the digital data;
   (e) computer readable program code means for causing a computer to effect coding uncoded sign data among the sign data corresponding to non-zero magnitude data among digit sequences coded in the means (d); and
   (f) computer readable program code means for causing a computer to effect performing the means (d) and (e) on respective digits of the digital data.

5. The computer usable medium according to claim 4, wherein means (a) is to cause a computer to represent the digital data as binary data having bits of the same number, wherein digits in the means (b) through (f) are bits.

6. The computer usable medium according to claim 5, wherein the coding means (b) through (f) cause a computer to code by coupling bits composing the respective bit sequences for the magnitude data and sign data, into units of bits of a predetermined number.

7. A computer usable medium having computer readable program code means embodied therein for decoding digital data coded in the order of significance by rating the significance of digits of the digital data, the computer readable program code means in said computer usable medium comprising:
   computer readable program code means for causing a computer to effect analyzing the significance of the coded digital data; and
   computer readable program code means for causing a computer to effect decoding the analyzed digital data by a predetermined decoding method from upper significant digits to lower significant digits.

8. The computer usable medium according to claim 7, wherein the decoding means comprises:
   computer readable program code means for causing a computer to effect losslessly decoding the analyzed digital data from upper significant bits to lower significant bits in the unit of vectors; and
   computer readable program code means for causing a computer to effect restoring bit-sliced data from the data decoded in the unit of vectors.

9. A computer usable medium having computer readable program code means embodied therein for decoding digital data coded in the order of significance by rating the significance of digits of the digital data, the computer readable program code means in said computer usable medium comprising
   (a) computer readable program code means for causing a computer to effect analyzing the significance of the coded digital data;
   (b) computer readable program code means for causing a computer to effect decoding the magnitude data of the analyzed digital data as a predetermined decoding method from upper significant digits to lower significant digits; and
   (c) computer readable program code means for causing a computer to effect decoding the sign data of the analyzed digital data to combine the decoded sign data with the decoded magnitude data.

10. The computer usable medium according to claim 9, wherein means (b) further comprises:
    computer readable program code means for causing a computer to effect losslessly decoding the analyzed digital data from upper significant bits to lower significant bits in the unit of vectors; and
    computer readable program code means for causing a computer to effect restoring bit-sliced data from the data decoded in the unit of vectors.

11. A computer usable medium having computer readable program code means embodied therein for audio coding, the computer readable program code means in said computer usable medium comprising:
    computer readable program code means for causing a computer to effect slicing audio data quantized for each predetermined frequency band into units of bits;
    computer readable program code means for causing a computer to effect collecting and coding MSBs among the bit-sliced data and successively collecting and coding bits sequentially from upper significant bits; and computer readable program code means for causing a computer to effect generating bitstreams in the order of significance of bits from the coded data and side information for the coded data.

12. The computer usable medium according to claim 11, wherein the bitstreams are generated sequentially from low frequency to high frequency, and from upper significant bits to lower significant bits.

13. A computer usable medium having computer readable program code means embodied therein for video coding, the computer readable program code means in said computer usable medium comprising:

computer readable program code means for causing a computer to effect quantizing a DCT performed input video signal;

computer readable program code means for causing a computer to effect dividing side information and quantized value information into units of bits, according to the significance of quantized data; and computer readable program code means for causing a computer to effect coding bit-sliced data in the order of the significance and generating bitstreams.

14. The computer usable medium according to claim 13, wherein the significance is related to the position of bits, the significance of the quantized data is highest in the most significant bit (MSB), and lowest in the least significant bit (LSB), with the significance decreasing with the significance of the bits.

15. The computer usable medium according to claim 13, wherein coding is performed sequentially from low frequency to high frequency.

16. A computer usable medium having computer readable program code means embodied therein for decoding bitstreams of coded video data, the computer readable program code means in said computer usable medium comprising:

computer readable program code means for causing a computer to effect analyzing the significance of bits composing the bitstreams and, and decoding side information having at least quantization bits and quantization means size, and quantized data, from upper significant bits to lower significant bits;

computer readable program code means for causing a computer to effect restoring the decoded quantization step size and quantized data into signals having the original magnitudes; and computer readable program code means for causing a computer to effect performing inverse DCT on the inversely quantized signals.

17. A computer readable medium having embodied thereon a computer program for coding a sequence of digital data of a predetermined number, the computer program being executable by a machine to perform:

(a) representing the respective digital data by digits of a predetermined same number; and (b) coding the digital data represented by the same number digits from the most significant digit sequences to the least significant digit sequences.

18. A computer readable medium having embodied thereon a computer program for coding a sequence of digital data of a predetermined number, the computer program being executable by a machine to perform:

(a) representing the respective digital data by digits of a predetermined same number;

(b) coding the most significant digit sequences composed of most significant digits of the magnitude data composing the represented digital data;

(c) coding sign data corresponding to non-zero data among the coded most significant digit sequences;

(d) coding the most significant digit sequences among uncoded magnitude data of the digital data;

(e) coding uncoded sign data among the sign data corresponding to non-zero magnitude data among digit sequences coded in the (d); and (f) performing (d) and (e) on respective digits of the digital data.

19. A computer readable medium having embodied thereon a computer program for decoding in the order of significant by rating the significance of digits of the digital data, the computer program being executable by a machine to perform:

analyzing the significance of the coded digital data; and decoding the analyzed digital data by a predetermined decoding method from upper significant digits to lower significant digits.

20. A computer readable medium having embodied thereon a computer program for decoding digital data coded in the order of significance by rating the significance of digits of the digital data, the computer program being executable by a machine to perform:

(a) analyzing the significance of the coded digital data;

(b) decoding the magnitude data of the analyzed digital data as a predetermined decoding method from upper significant digits to lower significant digits; and (c) decoding the sign data of the analyzed digital data to combine the decoded sign data with the decoded magnitude data.

21. A computer readable medium having embodied thereon a computer program for audio coding, the computer program being executable by a machine to perform:

slicing audio data quantized for each predetermined frequency band into units of bits;

collecting and coding MSBs among the bit-sliced data and successively collecting and coding bits sequentially from upper significant bits; and generating bitstreams in the order of significance of bits from the coded data and side information for the coded data.

22. A computer readable medium having embodied thereon a computer program for decoding bitstreams of coded audio data, the computer program being executable by a machine to perform:

analyzing the significance of bits composing the bitstreams, and decoding side information having at least quantization bits and quantization step size, and quantized data, from upper significant bits to lower significant bits;

restoring the decoded quantization step size and quantized data into signals having the original magnitudes; and converting inversely quantized signals into signals of a temporal domain.

23. A computer readable medium having embodied thereon a computer program for video coding, the computer program being executable by a machine to perform:

quantizing a DCT performed input video signal;

dividing side information and quantized value information into units of bits, according to the significance of quantized data; and coding bit-sliced data in the order of the significance and generating bitstreams.

24. A computer readable medium having embodied thereon a computer program for decoding bitstreams of coded video data, the computer program being executable by a machine to perform:

analyzing the significance of bits composing the bitstreams and, and decoding side information having at least quantization bits and quantization step size, and quantized data, from upper significant bits to lower significant bits;

restoring the decoded quantization step size and quantized data into signals having the original magnitudes; and performing inverse DCT on the inversely quantized signals.

* * * * *